United States Patent [19]

Schmidt

[11] 4,085,729
[45] Apr. 25, 1978

[54] SOLAR AIR HEATER
[75] Inventor: Roger N. Schmidt, Plymouth, Minn.
[73] Assignee: Honeywell Inc., Minneapolis, Minn.
[21] Appl. No.: 740,639
[22] Filed: Nov. 10, 1976
[51] Int. Cl.² ............................................. F24J 3/02
[52] U.S. Cl. .................................................. 126/270
[58] Field of Search ............... 126/270, 271; 237/1 A; 60/641; 165/109, 181, 182

[56] References Cited
U.S. PATENT DOCUMENTS

| 2,680,437 | 6/1954 | Miller | 126/270 |
| 3,875,925 | 4/1975 | Johnston | 126/270 |
| 3,939,818 | 2/1976 | Hamilton et al. | 126/270 |

FOREIGN PATENT DOCUMENTS 1,234,792  10/1960  France ............................... 126/271

Primary Examiner—Kenneth W. Sprague
Assistant Examiner—James C. Yeung
Attorney, Agent, or Firm—Charles G. Mersereau; Henry L. Hanson

[57] ABSTRACT

An improved low-cost solar air heater is disclosed which utilizes an array of holes or jets in an intermediate solar window to produce impingement of the air on the upper or solar energy absorbing surface of the absorber plate to enhance heat transfer efficiency and reduce convection losses from the system.

7 Claims, 4 Drawing Figures

SOLAR AIR HEATER

CROSS-REFERENCE TO RELATED APPLICATION

Reference is made to co-pending application by Asbjorn M. Severson and Richard L. Sampson, Ser. No. 740,640 filed of even date, and assigned to the same assignee as the present invention. That application is also concerned with a solar air heater.

By that invention, an array of jets is utilized to produce impingement of unheated air on the lower surface of the absorber plate. Thus, intake air is supplied to a plenum chamber beneath the absorber plate from which it is supplied through the jets to impinge on the lower surface of the absorber plate. By the present invention, a plurality of holes or air jets are arranged to cause the unheated air to impinge on the upper surface of the absorber panel. Thus, the intake plenum is located above rather than beneath the absorber plate.

BACKGROUND OF THE INVENTION

1. Field of the Invention

The present invention relates generally to solar energy and to the utilization of solar energy for heating and cooling. More particularly, the present invention involves an improved solar air heater.

2. Description of the Prior Art

Because the rapid depletion of conventional sources of energy is resulting in an ever-worsening energy crunch, the use of solar energy is becoming increasingly important as an alternative to such conventional sources as petroleum. This is especially true in the field of heating and cooling and in electric power generation.

The use of solar collectors which use solar energy to heat a black body absorber plate which, in turn, is used to transfer absorbed energy in the form of heat to a fluid heating medium is becoming an important source of at least part of the heat requirement for homes and other buildings. The prior art is replete with numerous attempts to utilize solar collector panels to heat a variety of fluid media by contacting such media with a solar absorber member. The typical solar collector heat transfer media includes water as a liquid medium and air as a gaseous medium.

The use of solar energy heat transfer systems employing liquid fluids such as water rather than gaseous fluids such as air does enjoy two principal advantages. The higher heat transfer coefficients of the liquid media results in lower temperature differences between the liquid and the absorber panel. Also, because liquids have a much higher heat capacity and smaller volume per unit mass, a physically smaller ducting system from the collector to the storage tank or heating system will suffice.

The above advantages, however, are in many cases far outweighed by the major disadvantages from which a liquid system suffers. Liquid systems are subject to leakage and therefore all elements of this system including the absorber panel, all connecting piping and heat storage area must be of leakproof construction. Also, because many of these systems are basically water-based systems, anti-freeze such as ethylene glycol or the like must be added to the liquid medium to prevent freezing. In addition to the leakproof nature of the entire system, the system must be made of a material which is not subject to corrosion by the liquid heat transfer medium. All these are concerns which are real and expensive or difficult to combat in a liquid system yet are unimportant to an air system. With an air system some leakage can be tolerated and phase changes and corrosion do not present problems. The net result is that the liquid system becomes far more expensive than a typical air system because of the above-mentioned disadvantages.

Insofar as an air system itself is concerned, there are several heat transfer configurations which may be considered. Many prior art systems utilize what is essentially a parallel flow wherein the intake air which is being heated is caused to flow parallel to the surface of the absorber plate as the heat transfer therebetween takes place. An example of the use of air as the heat transfer medium in such a system is found in U.S. Pat. No. 2,998,005 issued to J. G. Johnson dated Aug. 29, 1961. That patent illustrates and describes, inter alia, a solar collector which may use air as the heat transfer medium. While this and similar configurations are easily constructed and inexpensive, the configuration produces a slow moving laminar boundary layer adjacent the heat transfer surface which detracts from the efficiency of the heat transfer because of the slow moving boundary layer. In order to enhance heat transfer, the channel must be narrowed resulting in a higher pressure drop within the system which, of course, necessitates the use of a higher horsepower air circulation system and lowered overall efficiency.

Another alternative system makes use of finned plates to enhance the heat transfer between the absorber plate and the air by increasing the area of contact therebetween. This arrangement seems to work effectively both from the heat transfer and pressure loss standpoints, however, the finned plate construction is relatively expensive in comparison to flat parallel plate construction.

SUMMARY OF THE INVENTION

According to the present invention there is provided a solar collector air heater which exhibits a high heat transfer efficiency with reduced convection losses, relatively low system pressure losses and is relatively inexpensive to construct. The solar collector with the present invention includes an inlet air plenum chamber between the solar energy admitting window and the solar energy absorber plate. The surface of the air intake plenum adjacent the solar energy absorber plate includes an array of holes or air jets through which the unheated air is directed to impinge on the upper or exposed side of the solar absorber plate. This configuration not only breaks up the typical parallel flow laminar boundary layer which exists at the interface between the flowing air and the absorber plate in conventional laminar flow systems but also greatly reduced convection losses from the upper surface of the absorber plate itself thereby increasing the overall heat transfer efficiency of the collector. The preferred embodiment includes a transparent admittance window for the admission of the sun's rays, a perforated or jet nozzle containing air distribution member which forms the other or lower boundary of an air intake plenum chamber spaced beneath the window. The air distribution member is also transparent to solar radiation. A thin absorber plate is spaced beneath the air distribution member and forms a lower or heat transfer plenum therewith such that air flowing through the perforations or nozzles is caused to impinge against the upper or exposed surface of the absorber plate. An air intake passage is provided which allows air to be admitted to the air intake plenum chamber and an air outlet passage which allows air to be admitted to the air intake plenum chamber and an air outlet passage which allows air to be exhausted from the lower chamber formed by the absorber plate and the lower surface of the air distribution member.

Either of the air inlet or outlet passages may be attached to a means for moving the air such as a conventional make-up air blower used in conjunction with the heating and cooling systems of most buildings to provide a pull-through or push-through system. Spacing between the nozzles and the absorber plate including the angle therebetween may be adjusted such that the heat transfer efficiency of the system may be maximized. The size and spacing of the perforations or nozzles may also be varied as required by the embodiment involved. A plurality of such collector panels can be manifolded together and used in conjunction with a single blower system.

BRIEF DESCRIPTION OF THE DRAWINGS

In the drawings wherein like numerals are utilized to designate like parts through the same:

FIG. 3b is an end elevational view of the perforated plate of FIG. 3a.

DESCRIPTION OF THE PREFERRED EMBODIMENT

Figure 1:
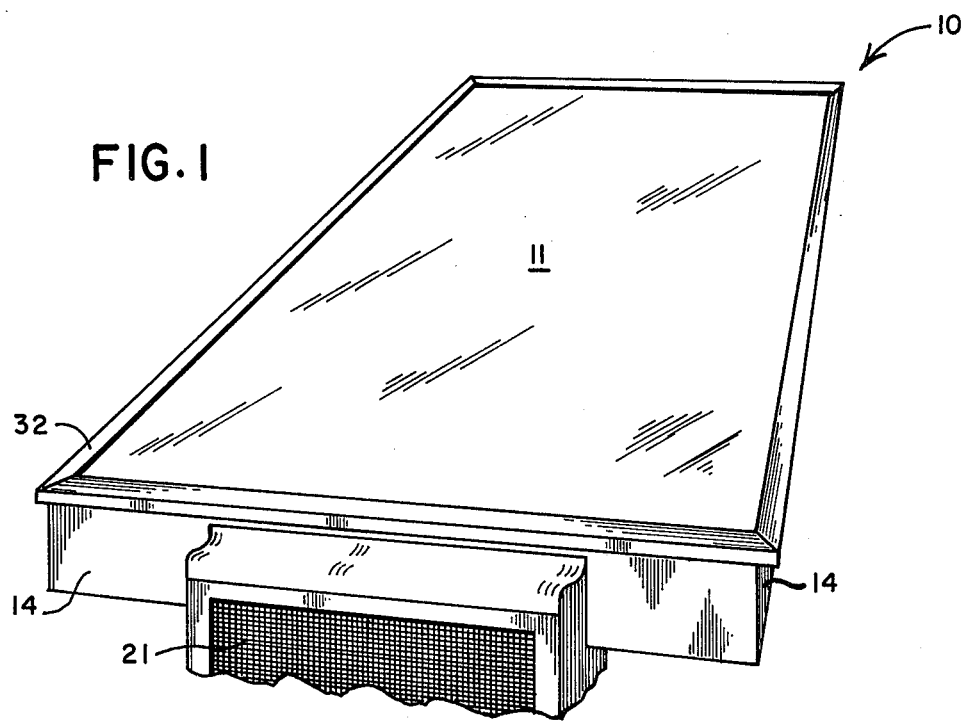
FIG. 1 is a perspective view of a typical assembled solar air heater utilizing the present invention.
Figure 2:
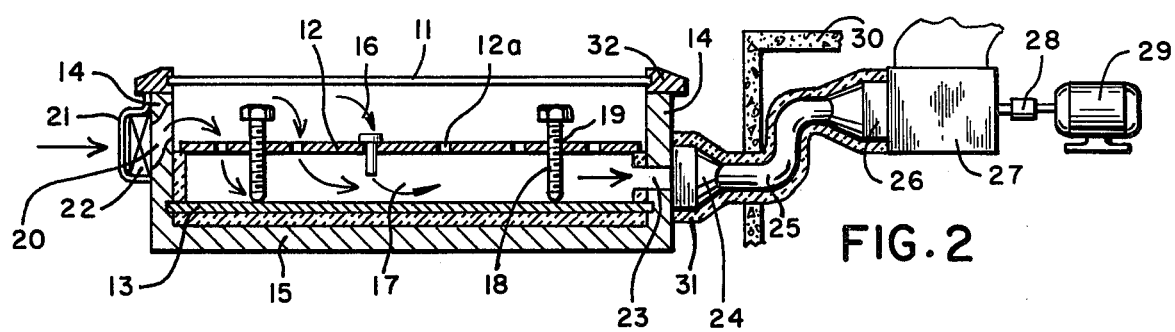
FIG. 2 is a side view, partially in section, of a solar air heater panel such as that shown in FIG. 1 and associated system utilizing the invention.

In the drawings, FIG. 1 represents a perspective view of a typical assembled solar collector air heater panel 10, the components of which can best be described also with reference to the sectional portion of FIG. 2. The collector panel includes a solar energy admitting window 11 which may be made of any suitable transparent sheet material such as plastic or glass. The upper or initial surface of the solar energy admitting window is normally treated in a manner to reduce the reflection from the upper surface to enhance the transmittance of the solar energy therethrough as by painting with an anti-reflection coating or by a suitable etching process. The air distribution plate or panel 12 is disposed beneath or beyond the solar energy admitting window 11. The air distribution plate 12, like the window 11, must be fabricated of a material transparent to solar radiation and is normally treated to reduce reflection. Spaced beneath the air distribution panel 12 is the solar absorber plate 13. The solar air heater is provided with suitable side wall panels 14 and a bottom panel 15 which form with the panels 11, 12 and 13 and upper or intake air plenum chamber 16 in a lower or exhaust air plenum chamber 17. The relative position between the air distribution plate 12 and the solar absorber plate 13 may be adjusted as by the use of adjusting screws 18 threaded through the member 12 as at 19.

The assembly 10 is provided with an air inlet to the air inlet intake plenum 16 as at 20. The air intake system may include a bird screen 21 in conjunction with a filter as shown at 22. Heated air is exhausted through an outlet 23 which may be in the form of a slot extending the length of the panel which leads to a collector 24 which, in turn, is fitted or provided with an exhaust duct 25 which connects to an inlet 26 of a conventional air blower unit 27 which, in turn, is coupled as at 28 to a drive motor 29 in conventional fashion. In most applications the motor and blower system are located within the building to protect them from the weather, etc. Thus, a wall is shown at 30 separating the blower system from the solar air heater 10. It will be appreciated that where necessary as at 31 the piping system may be insulated to further reduce heat losses from the system as required. A coping top 32 may be provided to overlap the edges of the solar radiation admitting window 11.

Figure 3A:
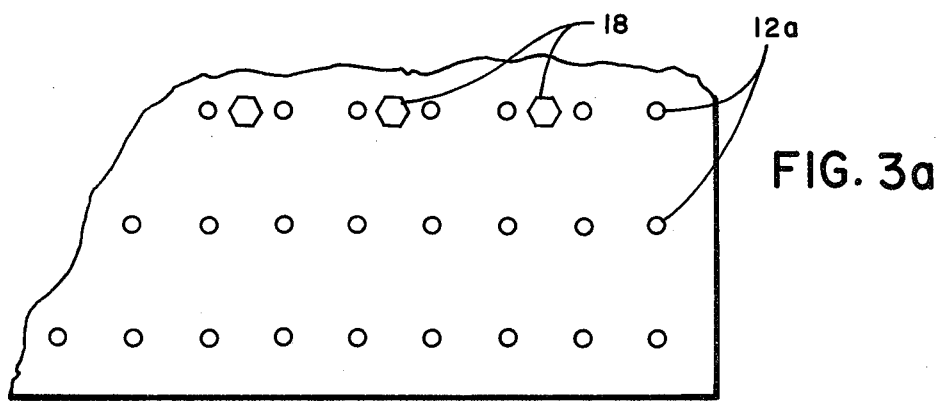
FIG. 3a is an enlarged, fractional top view of the perforated plate of FIG. 2.
Figure 3B:
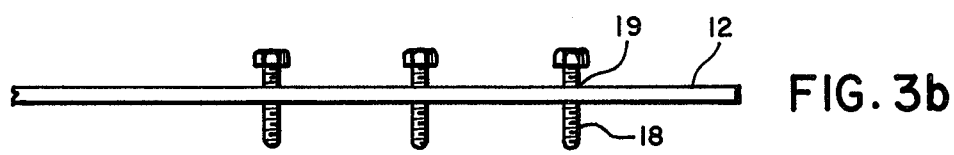

As can better be seen in FIGS. 3a and 3b, the openings 12a in the air distribution member 12 are spaced in a regular pattern. It should also be appreciated that instead of the holes 12a nozzles or jets or other such conventional gas directing members may be used in the holes 12a. Nominally, the openings range from about 0.2 to about 0.4 inches in diameter and are spaced approximately from 1 to 4 inches apart in either a square or other conventional hole pattern. Such holes may readily be formed as by drilling a regular pattern of holes in the air distribution plate 12a.

The system as shown operates in a pull-through mode. Thus, with the blower 27 operating air is pulled through the inlet 20 to the filter system with either the intake plenum chamber 16 where it is caused to flow through the pattern of holes or nozzles 12a into the heating chamber 17 where the velocity produced by the flow through the openings 12a causes the air to impinge on the upper surface of the absorber plate 13 and sweep along that surface to the exhaust slot 23 where the heated air is exhausted from the solar air heater 10 into the air circulation system.

Of course, the size and spacing of the openings or nozzles 12a along with the adjustable spacing and angle between the air distribution member 12 and solar absorber plate 13 may be adjusted such that the flow through the openings 12a is essentially uniform throughout the area of the absorber panel producing an essentially uniform impingement of the air on the upper surface of the absorber plate. This produces essentially the optimum uniform heat transfer between the solar-energy heated upper surface of the absorber plate 13 and the air which is being heated from that surface. The use of an array of openings or jets in the manner of the present invention offers all the advantages associated with a high heat transfer rate between the air and the absorber plate, low system pressure drop and low cost construction. By pulling or forcing the air through the array of openings or jets 12a so that it impinges on the upper surface of the absorber plate, a relatively high average heat transfer coefficient is achieved over the entire plate and the use of impinging air also breaks up the laminar boundary layer associated with parallel plate flow. Thus, a nozzle velocity of 20 to 30 feet per second on an air volume of approximately 2 to 5 SCFM per square foot absorber produces excellent heating results. The construction, while somewhat more expensive than the simple provision of two parallel plates, is a great deal less expensive than either a finned plate construction or any of those involving liquid fluid heat flow transfer media.

In addition to the advantages listed above pertaining to the utilization of openings or jets such as 12a, certain distinct advantages are accomplished by locating the air distribution plate 12 above or ahead of the solar energy absorber plate 13 in the optical path of the solar energy. Because the heat transfer is accomplished at the first or upper surface of the absorber plate 13 rather than at the lower surface, the requirement of conducting the heat through the thickness of the absorber plate 13 is eliminated. Also, convection losses which normally occur between the upper surface of the absorber plate and the ambient surroundings are greatly reduced by the utilization of that upper surface as the primary heat transfer surface. This, of course, results because the upper or initially contacted surface of the absorber plate 13 is cooled in the mechanism of heat transfer to the heating air and a stream of air to be heated is maintained between the absorber plate and the outer surface of the solar air heater.

The embodiments of the invention in which an exclusive property or right is claimed are defined as follows:

1. A solar air heater comprising:
   a window member in substantially sheet form for admitting solar radiation to said air heater, said window member being transparent to solar radiation and impervious to air;
   an absorber member in substantially sheet form disposed in spaced relation to said window member, said absorber member being highly absorbent to solar energy, impervious to air and disposed to receive solar energy transmitted by said window member;
   an air distribution member in substantially sheet form interposed between said absorber member and said window member in spaced relation thereto said distribution member being transparent to solar radiation and having a plurality of openings therein;
   closure means adapted to receive said window, absorber and air distribution members in spaced relation forming chambers therebetween, said chambers including a first chamber formed between said window member and said air distribution member and a second chamber formed between said air distribution member and said solar energy absorber member;
   and wherein said plurality of openings in said air distribution member are predetermined in size and pattern such that air flowing from said first chamber to said second chamber impinges on the absorbing surface of said absorber member;
   means for admitting unheated air to said first chamber; and
   means for exhausting heated air from said second chamber.

2. The solar air heater of claim 1 wherein said air distribution member is disposed in substantially parallel relation to said absorber member.

3. The solar air heater of claim 1, wherein said air distribution member is in the form of a perforated sheet.

4. The solar air heater of claim 1 further comprising means for adjusting the relative relation between said absorber and said air distribution member.

5. The solar air heater of claim 1 further comprising a plurality of nozzles disposed in the openings in said air distribution member.

6. The solar air heater of claim 1 wherein said means for admitting air and said means for exhausting heated air are located at opposite ends of said air distribution member.

7. The solar air heater of claim 1 wherein said size and pattern of said plurality of openings in said distribution member is such that substantially uniform heat transfer is accomplished throughout the area of said absorber member.

* * * * *